(12) United States Patent
Altschuler (10) Patent No.: US 8,650,090 B2
(45) Date of Patent: *Feb. 11, 2014

(54) METHODS AND SYSTEMS FOR SELLING A PRODUCT/SERVICE BEFORE OR DURING A FIRST PURCHASE IN AN ELECTRONIC MARKETPLACE

(75) Inventor: Andrew Altschuler, Miami, FL (US)

(73) Assignee: Exp Commerce Dot Com Ltd., Jerusalem (IL)

( * ) Notice: Subject to any disclaimer, the term of this patent is extended or adjusted under 35 U.S.C. 154(b) by 75 days.

This patent is subject to a terminal disclaimer.

(21) Appl. No.: 13/366,625

(22) Filed: Feb. 6, 2012

(65) Prior Publication Data
US 2012/0143710 A1    Jun. 7, 2012

Related U.S. Application Data

(63) Continuation of application No. 13/155,353, filed on Jun. 7, 2011, now Pat. No. 8,112,319, which is a continuation of application No. 11/789,666, filed on Apr. 24, 2007, now Pat. No. 7,962,374.

(60) Provisional application No. 60/794,793, filed on Apr. 24, 2006.

(51) Int. Cl.
*G06Q 30/00* (2012.01)
(52) U.S. Cl.
USPC .......................................................... 705/26.1
(58) Field of Classification Search
USPC ............................................... 705/26.1–27.2
See application file for complete search history.

(56) References Cited

U.S. PATENT DOCUMENTS

| | | | |
|---|---|---|---|
| 5,940,807 A | 8/1999 | Purcell | |
| 7,197,475 B1 | 3/2007 | Lorenzen | |
| 2003/0083961 A1 | 5/2003 | Bezos et al. | |
| 2004/0220864 A1 | 11/2004 | Popovitch | |
| 2005/0033655 A1 | 2/2005 | Woolston | |
| 2005/0060318 A1 | 3/2005 | Brickman | |
| 2005/0160014 A1 | 7/2005 | Moss et al. | |
| 2005/0177443 A1 | 8/2005 | Rodriguez et al. | |
| 2006/0136300 A1 | 6/2006 | Kopelman | |
| 2006/0229972 A1 | 10/2006 | Melo | |
| 2010/0115043 A1 | 5/2010 | King | |

OTHER PUBLICATIONS

Cox, Meg, "Manic-Market: Process of Hottest Art Reach Stunning Levels as Book Keep Going," Wall Street Journal (Eastern Edition), New York, NY, Nov. 28, 1998, p. 1.

*Primary Examiner* — William Allen
(74) *Attorney, Agent, or Firm* — Im IP Law PLLC; C. Andrew Im (57) ABSTRACT

A system and method for turning a buyer into a prospective seller in an electronic marketplace. After the buyer enters into a binding agreement to purchase an item, the buyer is provided with an option of re-listing the purchased item for resale. The purchased item is re-listed if the buyer opts to re-list it. An ecommerce listing to sell the purchased item is automatically generated based on the previous listing. The user only needs to provide the selling price to complete the listing. The purchased item can be re-listed in the same marketplace where the item was purchased or in a different marketplace.

16 Claims, 4 Drawing Sheets

METHODS AND SYSTEMS FOR SELLING A PRODUCT/SERVICE BEFORE OR DURING A FIRST PURCHASE IN AN ELECTRONIC MARKETPLACE

RELATED APPLICATION

This application is a continuation of application Ser. No. 13/155,353 filed Jun. 7, 2011 now U.S. Pat. No. 8,112,319, which is a continuation of application Ser. No. 11/789,666 filed Apr. 24, 2007, now U.S. Pat. No. 7,962,374, which claims priority benefit under Title 35 U.S.C. §119(e) of provisional patent application No. 60/794,793 filed Apr. 24, 2006, each of which is incorporated by reference in its entirety.

FIELD OF THE INVENTION

The present invention relates to commerce generally, more specifically, the invention relates to a method and system for turning a buyer into a prospective seller and providing interfaces and modules for seamlessly placing items for resale and performing related actions within an ecommerce site.

BACKGROUND OF THE INVENTION

Commerce—the marketing, buying, selling, and exchanging of products and services between two or more entities—has been around since the beginning of humankind. From its origins in local face-to-face transactions to 21st century global ecommerce, commerce continues to evolve. As ecommerce becomes increasingly sophisticated, and marketing and transaction channels that were once clearly distinct become more and more integrated, the distinction between offline and online commerce is disappearing.

The ecommerce systems have attracted large numbers of users, thereby generating large and varied product listings of both new and used products. However, such ecommerce systems commonly suffer from an inability to efficiently convert buyers into prospective sellers. Typically, sellers supply descriptions and images of the products they are selling. The task of generating ecommerce listings can be cumbersome, particularly for small merchants and non-merchant individuals.

That is, current ecommerce marketplace or sites and system supporting such sites and marketplaces are designed for products to be sold once to an end consumer. These ecommerce systems are not designed to handle where the products change hands many times over the life of the product. Typically, when an item is sold, the listing disappears and the item is no longer available for sale until the buyer (i.e., prospective seller) re-lists the item in the ecommerce site using the standard procedure of listing an item. The prospective buyers cannot view any listing associated with a sold item or any ownership history associated with that item. Certain ecommerce system providers have attempted to address this problem by providing their buyers with access to a list of items they bought on their ecommerce site or marketplace. The buyers can select to re-list a particular item from their purchase history list with the same ecommerce system provider. These ecommerce systems alleviate the prospective sellers from having to re-type the item descriptions and uploading images, but the prospective seller must go through the standard process of listing the item with the ecommerce system provider. That is, the ecommerce system does not differentiate between a newly listed and a re-listed item.

Today there are numerous multi-module e-commerce systems and providers offering technology, methods and services to enable a buyer and seller to transact in a multitude of ways, locally and globally, across multiple online and offline channels. Even with all of the sophistication, current e-commerce systems are designed for a product to be sold once; they have not been designed for a product to be bought and sold multiple times throughout a product's life. Current ecommerce systems suffer from an inability to efficiently, effortlessly and seamlessly transform the most recent buyer (current owner) of a product into a seller of the product.

Typically, when an item is listed on the ecommerce site for sale, the terms of that listing are binding on the seller. That is, if the buyer agrees to the terms on the listing, the seller must sell the item to the buyer. Similarly, if the item is listed for an auction, the seller must sell the item to the winning or the highest bidder. Accordingly, it may be desirable for a prospective seller to list the item to gauge interest in the marketplace for a particular item before actually listing the item for sale. For example, the prospective seller can use such information to determine the appropriate listing price when he/she decides to list the item for sale.

Therefore, it is desirable to provide an efficient system and method which seamlessly transforms the most recent buyer (current owner) of a product into the seller of the product, and to enable the buying and selling of a product multiple times throughout the life of the product.

SUMMARY OF THE INVENTION

The present invention overcomes aforementioned shortcomings in prior art by providing a system and method that seamlessly turns buyers into prospective sellers.

It is therefore an object of the present invention to provide an integrated multi-mode computer commerce system reaching across the entire online and offline spectrum of local and global commerce.

It is a further object of the present invention to provide a system and method that is the next dimension in the rapid evolution of commerce.

It is an additional object of the present invention to provide a system and method that propels the resale of a product multiple times throughout the product's life.

In accordance with an embodiment of the present invention, the system and method provides the buyer with an option of listing the purchased item for sale in the marketplace or soliciting interests or bids for the purchased item from prospective buyers.

In accordance with an embodiment of the present invention, the system and method as aforesaid provides such option to the buyer at the time of the sale, e.g., during, before or after the checkout process.

In accordance with an embodiment of the present invention, the system and method as aforesaid maintains transaction history for each item in the marketplace. That is, the transaction history includes at least one of the following: owner names, owner's user identifications, owner's email addresses, purchase dates, purchase price, method of sale, product description and product conditions.

In accordance with an embodiment of the present invention, the system and method as aforesaid provides an option for a seller or a prospective seller to add an ecommerce listing of a purchased product using the information contained in the corresponding transaction history. Since all the information required for a listing is already in the transaction history, the seller or prospective seller only needs to provide the selling price to complete the listing.

In accordance with an embodiment of the present invention, the system and method as aforesaid provides the buyer, at the time of the sale, the option of scheduling a reminder to place the purchased item for sale.

In accordance with an embodiment of the present invention, the system and method as aforesaid provides a prospective seller to generate a non-binding listing, i.e., a prospective listing.

In accordance with an embodiment of the present invention, a computer implemented method for generating multiple transactions from a buy/sell transaction of a product comprises the steps of: providing an option to list the product for resale by a buyer of the buy/sell transaction in an electronic marketplace; and generating a new listing based on information relating to the buy/sell transaction if the buyer elects to resale the product, thereby enabling the product to be sold multiple times.

In accordance with an embodiment of the present invention, a computer implemented method of managing an electronic marketplace for facilitating a plurality of users to purchase a product from a browsable electronic catalog comprises the steps of: generating a prospect list of a plurality of products interested or sought by a prospective buyer and notifying the prospective buyer if the product on the prospect list becomes available in any marketplace. Each product on the prospect list is identified by a product identifier, the product identifier being at least one of the following: universal product code (UPC), brand or model number.

In accordance with an embodiment of the present invention, a computer implemented method for managing an electronic marketplace for facilitating purchase products from a browsable electronic catalog by a plurality of users. The computer implemented method comprises the steps of: receiving an interest or an offer to purchase from a prospective buyer of a product; and appending a listing associated with the product to include the interest or the offer to purchase from the prospective buyer.

In accordance with an embodiment of the present invention, a computer implemented method for generating multiple transactions from a buy/sell transaction of a product comprises the steps of: receiving an option to list the product for resale by a buyer of the buy/sell transaction in an electronic marketplace; and receiving a new listing generated based on information relating to the buy/sell transaction if the buyer elects to resale the product, thereby enabling the product to be sold multiple times.

In accordance with an embodiment of the present invention, a system for generating multiple transactions from a buy/sell transaction of a product comprises a client device, a server and a listing database. The client device is connected to a communications network and associated with a buyer. The server is connected to the communications network and manages an electronic marketplace. The server comprises a creation module and a listing module. The creation module receives information related to the buy/sell transaction of the product and transmitting an option to list the product for resale to the client device associated with the buyer of the buy/sell transaction in the electronic marketplace. The listing module generates a new listing based on information relating to the buy/sell transaction if the buyer elects to resale the product, thereby enabling the product to be sold multiple times. The listing database stores said new listing.

In accordance with an embodiment of the present invention, a computer readable media comprising a code for generating multiple transactions from a buy/sell transaction of a product. The code comprises instructions for: providing an option to list the product for resale to a buyer of the buy/sell transaction in an electronic marketplace; and generating a new listing based on information relating to the buy/sell transaction if the buyer elects to resale the product, thereby enabling the product to be sold multiple times.

In accordance with an embodiment of the present invention, the computer implemented method as aforesaid further comprises the step of specifying a minimum price for the product.

In accordance with an embodiment of the present invention, the computer implemented method as aforesaid further comprises the step of maintaining a user history record comprising at least one of the following: user identification, products bought, products sold, names of counter-parties and user identifications of said counter-parties.

Various other objects, advantages and features of the present invention will become readily apparent from the ensuing detailed description, and the novel features will be particularly pointed out in the appended claims.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF THE EMBODIMENTS

An ecommerce system which embodies the above and other inventive features will now be described in detail. As will be apparent, many of the disclosed features may be used without others, and may be implemented differently than described herein and/or in combination with features not disclosed herein. Although described primarily in the context of a website system, the various inventive features are also applicable to other types of multi-user interactive systems in which users may browse and make purchases from an electronic listing, including but not limited to online services networks, interactive television systems, in-store kiosk systems, and systems that support browsing by voice.

In accordance with an embodiment of the present invention, the ecommerce system or the EXP Commerce system comprises various computer-implemented services through which ecommerce sellers can list products for sale and prospective sellers can re-list purchased products for resale and ecommerce buyers can browse through the ecommerce listings to purchase items from ecommerce sellers. The ecommerce site or marketplace is generally controlled, maintained or administered by an ecommerce provider or operator.

As used herein, commerce includes but is not limited to the marketing, buying, selling and exchanging of products and services or something of economic value between two or more individuals, businesses, governments or other entities, whether wholesale, retail, business-to-business, business-to-consumer, manufacturer to end buyer (manufacturer direct), consumer to consumer, domestic, international, online or offline, multichannel, cross-channel or the like.

Figure 1:
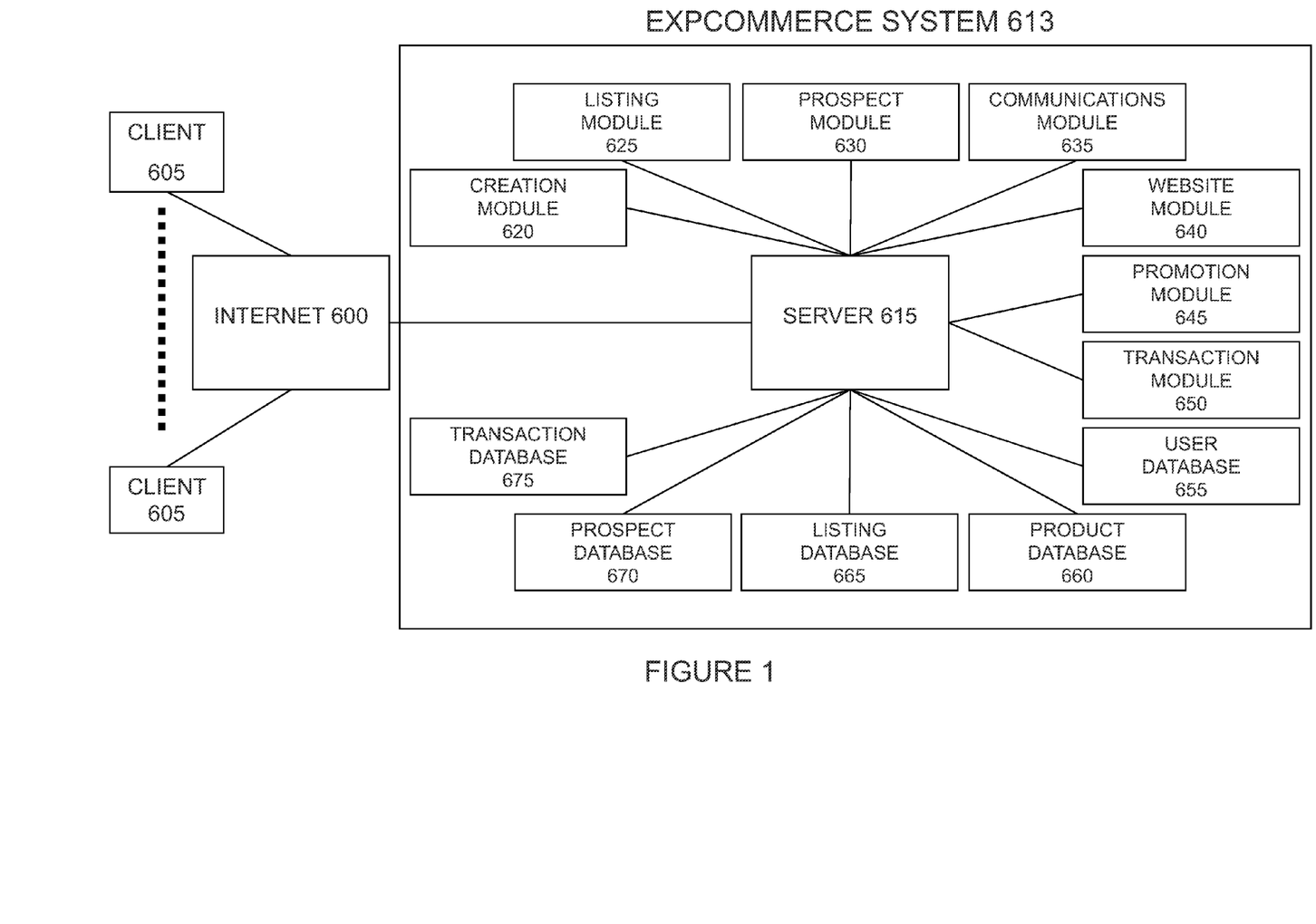
FIG. 1 is a schematic diagram of the ecommerce system in accordance with an exemplary embodiment of the present invention.

Turning to FIG. 1, in accordance with an embodiment of the present invention, the EXPCommerce System 613 ("EXPCommerce") comprises a server 615 which is connected to a communications network 600, e.g., the Internet. Server 615 comprises modules that perform the functionality and methods of the present invention as described herein. Primary modules include: the Creation Module 620, the Listing Module 625, the Prospect Module 630, the Communications Module 635, the Website Module 640, the Promotion Module 645 and the Transaction Module 650. Server 615 further comprises databases which can either be integral to the server or separately connected storage. Primary databases include the User Database 655, the Product Database 660, the Listing Database 665, the Prospect Database 660 and the Transaction Database 675. It is appreciated that all of these databases can be integrated into a single database. Users can remotely or directly access the EXPCommerce 613 through the electronic communications network 600 using Client Point of Entry Devices 605 including but not limited to PCs, PDAs, standard web browsers, web-enabled handheld devices, interactive kiosks, telephones, faxes, POS systems, EDIs, and the like. An individual, business, or other entity registers with the EXPCommerce 613 to become a user. Once registered, the user can access, perform buy/sell transactions acting as a buyer and/or seller and use the functionality of the EXPCommerce 613 as described herein.

In accordance with an embodiment of the present invention, the EXPCommerce 613 comprises the User Database 655 that stores information about the registered users of the EXPCommerce 613. For each registered user, the User Database 655 stores user unique parameters including but not limited to a user name, password, seller/buyer status, business information if applicable, shipping address, contact information, e-mail address, payment information, bank account information, preference settings, and other such relevant parameters. Users include but are not limited to buyers, sellers, prospective buyers, prospective sellers, and any other entities, whether individuals, businesses, or governments and the like. In addition, the User Database 655 stores event history parameters including but not limited to a user's listing, prospecting, communications, websites, promotions, transactions, feedback, payments, and other such relevant parameters.

In accordance with an embodiment of the present invention, the EXPCommerce system 613 can operate as a standalone electronic marketplace or as an add-on to an existing electronic marketplace to provide various features of the present invention as described herein.

In accordance with an embodiment of the present invention, the EXPCommerce 613 comprises a Creation Module 620. The Creation Module 620 comprises web crawlers, spiders, bots and the like that search multiple third-party online and offline transaction channels and capture and import any sold product into the EXPCommerce 613 for the possible future re-sale of the product. Products include but are not limited to: products, services, physical products, intangible services, digital products, content, software, a combination of products and services, currencies, real estate, securities, leases, licenses, rentals, subscriptions, information, and other types of business transactions.

Online transaction channels include but are not limited to third-party business to business (b2b), business to customer (b2c), and customer to customer (c2c) websites and shopping portals. The Creation Module 620 can be electronically integrated with most shopping cart checkout systems of online transaction channels by methods and procedures known to those of skill in the art. For online transaction channels that are not electronically integrated with the EXPCommerce 613, a buyer can send EXPCommerce 613 a form email or a copy of the transaction confirmation page from the non-integrated electronic transaction channel. In a further embodiment, EXPCommerce 613 further comprises a toolbar that can be downloaded and integrated into a standard web browser. The toolbar provides the user with the ability to capture information from a transaction confirmation page and thus facilitates entering the information into EXPCommerce 613. For a product purchased through an offline transaction channel, a user (i.e., a buyer) can enter the product into the Creation Module 620 by accessing the EXPCommerce 613 through the communications network 600 using a Client Point of Entry Device 605.

A buyer can immediately be transformed into a seller/prospective seller before, during and/or after the checkout process and an immediately resell a product, list a product for resale (as a binding or non-binding listing), receive/accept solicitations for the newly purchased item, and/or at some time in the future use the EXPCommerce 613 to relist and/or accept solicitations for the purchased item.

The Creation Module 620 queries the buyer before, during, or immediately after the time of purchase, and/or multiple times in the future by presenting a graphical user interface containing the query: "Do you want to relist this product for possible resale now?" Typically the graphical user interface contains a "yes" and "no" radio box with the "yes" box selected by default. Buyers who wish to answer "no" can uncheck the "yes" radio box and check "no". Typically if a buyer checks "no", then the Creation Module 620 will cause another graphical user interface to appear containing the query: "Is it possible that you may wish to relist this product for possible resale at some time in the future?"

If the buyer does not register a product during the checkout, the buyer can notify the EXPCommerce 613 that he/she is ready to list the purchased item for resale in the future. In one embodiment, the EXPCommerce 613 communicates with the buyer on a periodic basis querying if the buyer wishes to sell the purchased product or would consider selling the purchased product in the future. In a further embodiment, the buyer can set reminders instructing the EXPCommerce 613 to contact the buyer at a specific time such as in a year. The EXPCommerce 613 will then query the buyer in a year as to whether the buyer wishes to create a product listing to resell the purchased product. The buyer can schedule the EXPCommerce 613 to contact the buyer at a specified or predetermined time in the future to query whether the buyer wishes to create a listing to resell the purchased product. The buyer can also schedule the EXPCommerce 613 to contact the buyer at a specified time in the future with a reminder to list the purchased product as a binding and/or non-binding offer for sale.

In accordance with an embodiment of the present invention, the EXPCommerce 613 comprises a Listing Module 625 to generate a listing for a product once it is captured by the Creation Module 620. The Listing Module 625 stores and retrieves the previous listing associated with the product from the Listing Database 665. The EXPCommerce 613 instantly and seamlessly transforms the most recent buyer into a seller/prospective seller and generates a listing to list a product for resale without going through the current industry standard listing process of entering product information. However, for a product being sold for the first time, the Listing Module 625 also has standard tools to enable a user (i.e., a seller) to generate an initial product listing.

The Listing Module 625 generates a listing for resale from the product information captured previously by the Creation Module 620 and stored in the Product Database 660. The static product information captured by the Creation Module 620 typically does not change as a product is resold multiple times throughout its life. Static product information includes but is not limited to: product name/title, description, manufacturer, brand, model number, UPC, product dimensions, product weight, shipping dimensions, shipping weight, product materials, packaging, warranty information, author, artist, ISBN, product images, merchandising collateral and/or other relevant information. Although the static information typically does not change, seller/prospective seller can modify any of this static information. The EXPCommerce 613 stores any changes and displays the changes in the product listing. For a product that is being sold for the first time, and/or for which no product data currently exists within EXPCommerce 613, a user can enter the product data using the Listing Module 625.

Variable information typically changes each time a product is listed for resale, and the variable information should be updated by the seller/prospective seller. Variable information includes, but is not limited to, one or more of the following: pricing, condition of the product, terms of availability, location, shipping terms/options/limitations, and/or any other relevant information.

In accordance with an embodiment of the present invention, product listings also contain historical transactional and ownership information related to previous purchases of the product that accumulates as the product is sold multiple times. The EXPCommerce 613 stores and retrieves the historical transactional and ownership information in and from the Transaction Database 675. Historical transactional information includes but is not limited to: transaction channel, unique transaction number, transaction date, seller, buyer, communication/negotiations between seller and buyer, location of product, ship method, listing price, transaction price or other consideration (if different from listing price), listing fees, commissions, product condition, condition update notes, returns, exchanges, product reviews and other relevant information. The EXPCommerce 613 updates and appends the historical transactional and ownership information each time a product is sold, and attaches it to the product listing each time a product is listed for resale. Historical transactional and ownership information cannot be modified. The seller/prospective seller can select to hide the historical and ownership information, although hiding such information may discourage a potential buyer.

In a further embodiment, the EXPCommerce 613 can suggest a selling price based on at least one of the following: the current selling price of a same or similar product in the marketplace or other marketplaces; purchase price history of a same or similar product; and/or the product ownership history for a same or similar product. In addition, during the listing process and/or anytime thereafter, seller/prospective seller can request and receive information about prospective buyers, supply and demand for the product, etc; which may influence the seller/prospective seller to modify a selling price or other terms of the listing.

In accordance with an embodiment of the present invention, a buyer can be transformed into a seller and can list a product for resale in a binding manner in which the seller is obligated to sell the product according to the terms of the product listing specified by the seller. Alternatively, a buyer can be transformed into a prospective seller and can create a non-binding listing, in which the prospective seller: can explore the opportunity of selling the product but is not obligated to sell the product; and can solicit interested prospective buyers to communicate their interest in, inquire about, and/or submit purchase offers for the product. A non-binding listing can be used by a prospective seller to gauge the level of current demand for a product and influence a prospective seller to eventually decide to sell the product. The prospective seller can select to generate a non-binding listing with or without a price, and can select whether or not to display the price.

In accordance with an embodiment of the present invention, the EXPCommerce 613 supports fixed-price sales, auctions or both. The Listing Module 625 enables a seller to generate listings to sell a product via an auction. Auctions can occur within the EXPCommerce 613 or on a third-party auction platform such as but not limited to eBay®, Ubid®, Yahoo!® Auctions, Amazon Auctions®, and Overstock.com Auctions$^{SM}$, or an offline auction, whether live-in person or via telephone or mail or any other industry standard method of conducting an auction.

In accordance with an embodiment of the present invention, the EXPCommerce 613 comprises a Communications Module 635 which enables communication between registered users and between a registered user and the EXPCommerce 613 system. The Communications Module 635 enables communication via email, phone, fax, EDI, xml, ftp mail, and other industry standard communication methods.

The seller/prospective seller can choose to initiate an auction for a product after a select number of prospective buyers, with or without qualifications, specified by the seller/prospective seller, register to participate in the auction for the product. The Communications Module 635 notifies the seller/prospective seller when a predetermined number of prospective buyers or bidders express an interest in bidding for the product and have registered to participate in the auction for the product. The seller/prospective seller can choose whether or not to make known the select number of registered prospective buyers required to initiate the auction, as well as whether or not to make known the qualifications specified by the seller/prospective seller. The Communications Module 635 communicates the above-mentioned processes to the seller/prospective seller and prospective buyer.

In accordance with an embodiment of the present invention, the EXPCommerce 613 comprises a Website Module 640 comprising one or more websites for creating, listing, marketing, promoting, prospecting, communicating, transacting, and performing all other functions and methods described herein. In addition, the EXPCommerce 613 provides a user with the option to create one or more user-branded websites pointing to a domain name of their choosing, hosted by the EXPCommerce 613, displaying product listings of their choosing, and performing the functions and methods described herein.

In accordance with an embodiment of the present invention, the EXPCommerce 613 comprises a Promotion Module 645 to place, market, promote, or advertise a product listing on various suitable platforms including but not limited to:

the EXPCommerce Website(s), user-branded EXPCommerce websites, and search and paid/unpaid placement within the websites;

across multiple paid and/or unpaid online and offline marketing channels selected by the seller/prospective seller including but not limited to search engines, email marketing, affiliate marketing, CSE sites, affiliate sites, shopping portals, viral marketing, and other such channels in which the buyer/prospective buyer clicks through to the EXPCommerce Website(s), and EXPCommerce user-branded websites;

integrated marketing-transaction channels in which transactions occur on the channel, such as portals like eBay, amazon.com, overstock.com, Shop.com™ and other third-party websites;

brick-and-mortar store displays, interactive kiosks, POS systems, direct mail, catalogs, print, television, telephone, and other online, offline, and online-offline integrated channels.

In accordance with an embodiment of the present invention, buyers can locate listings for a particular product and buy the same product multiple times throughout a product's life. The buyer/prospective buyer can locate product listings across marketing channels on which the seller/prospective sellers have selected to promote product listings employing a number of industry standard mechanisms to locate one or more products of interest. To locate listings within the EXPCommerce Website(s), and/or the EXPCommerce user-branded websites, users can browse a hierarchy of product categories and associated products, enter search terms into a search engine and obtain search results, and employ a number of other conventional mechanisms to locate products of interest. For products listed on online channels, the buyer/prospective buyer typically locates and browses product listings over the Internet or other network using a standard web browser.

In accordance with an embodiment of the present invention, the EXP Commerce 613 comprises a Prospect Module 630. The Prospect Module 630 stores and retrieves a prospective buyer's prospect list in the Prospect Database 660. The EXPCommerce 613 gives the option and ability for the buyer/prospective buyer to create and manage a Prospect List (binding and/or non-binding) for one or more products which the buyer/prospective buyer is interested in or desires to buy, whether or not the product is currently available or unavailable. Searching the Transactional Database 675 to determine the current owner of a desired product, and using the Communications Module 635, a prospective buyer can contact the current product owner.

A product that a prospective buyer wishes to add to the prospective buyer's Prospect List is specified/selected using the Prospect Module 630 according to a unique identifier such as UPC, brand, model, etc., or by browsing categories of products, or by specifying a range of desired criteria including but not limited to one or more of the following: categories, brands, models, conditions, colors, price, geographic location, and the like. A prospective buyer can add products to the Prospect List for a multitude of reasons, including but not limited to: the product supply is too high or too low, the product has been on the market/available for sale for an inadequate period of time; the prospective buyer is interested in the product at some time in the future; the demand is too high or too low; the product is not currently available for sale; the product is not available in a respective geographic region; shipping limitations; the seller will not sell to the prospective buyer; the prospective buyer does not wish to buy from the seller; the current product price exceeds the amount the prospective buyer wishes to pay; the product does not exist.

The EXPCommerce 613 can utilize a product's ownership or transactional history or other means to identify the owner(s) (potential prospective sellers) of the product, and proactively solicit the owner(s) to create a product listing for the product. The proactive solicitations can be triggered by a change in supply/demand for the product, by the addition of the product to a prospective buyer's Prospect List, or for any other reason. In addition, the existence of a product on a Prospect List is communicated to all seller/prospective sellers during the creation of a listing for the product, as well as after the listing is created. The seller/prospective seller has the option and ability to modify the listings accordingly. The existence of a product on a prospective buyer's Prospect List is displayed on all listings for the product. In addition, the EXPCommerce 613 can solicit prospective buyers. Such solicitations are communicated via the Communications Module 635 and/or displayed when the user(s) accesses the EXPCommerce 613.

The seller/prospective seller can create one or more conditions under which the Communications Module 635 should notify the seller/prospective seller. Conditions may include but are not limited to: a specified or predetermined change in supply or demand of the product or any other specified product; when/if the product has been on the market/available for sale for a specified period of time; when a prospective buyer specifies to be notified now or at some time in the future regarding the seller/prospective seller's product; the qualifications of the prospective buyer, including the feedback rating, geographic location, or transactional history.

A prospective buyer can specify certain conditions and select whether to be notified when one or more specified conditions are met. Conditions that can be specified include but are not limited to: a specified change in the product supply/demand; the product has been on the market/available for sale for a specified or predetermined period of time; a specified future date arrives; a specified or predetermined change in the product availability with respect to a geographic region; a specified change in a shipping limitation; a seller who would not sell to the prospective buyer is now willing to sell; a specified/unspecified additional seller(s) is/are now selling the product; a specified or predetermined change in the product price; the product that did not exist now exists.

The Communications Module 635 enables the buyer/prospective buyer to communicate with the seller/prospective seller and send offers. The Communications Module 635 notifies the seller/prospective seller of offers from the prospective buyers that equal or exceed a predetermined amount specified by the seller/prospective seller, or an offer regardless of the amount of the offer. The predetermined amount specified by the seller/prospective seller may or may not be made available to the buyer/prospective buyer. The buyer/prospective buyer can send and the seller/prospective seller can receive notifications expressing an interest in or requesting additional information about a product, such as a condition update.

The EXPCommerce 613 enables a buyer to specify a desired purchase price and/or other criteria (condition, location, seller criteria) for a selected product on a Prospect List, and to automatically transact on behalf of the buyer/prospective buyer to buy the product when the product is available for sale and meets the specified criteria.

In the case where there is a seller who creates a product listing with the intent to sell the product (most frequently when the product's value depreciates over time, although not always), a prospective buyer (buyer 1), and a subsequent prospective buyer (buyer2) who may buy the product from buyer1 after buyer1 takes ownership of and wishes to resell the product in the future (perhaps buyer2 cannot afford to buy the product at its current selling price or does not need the product now but may need the product in the future or does not like the current seller): for buyer2 to commit (binding) or express interest (non-binding) to being a future buyer of the product before buyer1 buys the product, to register buyer2's commitment or interest, to display buyer2's commitment or interest as part of the product listing, and to communicate buyer2's commitment or interest to buyer1 prior to buyer1's purchase of the product. Such commitment or interest can increase the value of the product and/or encourage buyer1 to buy the product because buyer1 knows that the product can/may subsequently be resold to buyer2.

In accordance with an embodiment of the present invention, the EXPCommerce 613 comprises a Transaction Module 650 to enable the buying and selling of a product through the EXPCommerce Website(s), the user-branded EXPCommerce websites, and across multiple other third-party online and offline transaction channels. The Transaction Module 650 contains a settlement system that integrates with third-party payment processing systems such as PayPal®, Google Checkout$^{SM}$, Western Union®, credit card gateways and other systems to process credit or debit card payments, electronic checks, wire transfers, bank account transactions and the like.

When a buyer purchases a product in accordance with the present invention, the Transaction Module 650 can use pre-specified shipping and payment information to expedite the completion of the transaction. The Transaction Module 650 prompts the buyer to confirm the shipping address and payment method retrieved from the User Database 655 or to enter new or correct information. In addition, the Transaction Module 650 also processes returns and credits, and has the functionality to apply coupons and discounts in a variety of fashions, and other industry standard transaction processes.

The Communications Module 635 transmits purchase orders and purchase confirmations to sellers. Sellers return confirmation of receipt and ship confirmations. The Communications Module 635 transmits purchase confirmations and ship confirmations to buyers. A purchase confirmation, preferably including shipping tracking information, is typically transmitted by email to the buyer. In addition, the Communications Module 635 notifies users of initiated, processed and completed returns, credits, payment notifications and the like.

In accordance with an embodiment of the present invention, the EXPCommerce 613 comprises a feedback system giving the option and ability for users to post feedback about other users with whom they have transacted. The feedback postings are stored in and retrieved from the User Database 655. Feedback for a user can be found in the user's profile. Feedback for a seller/prospective seller is displayed on each product listing created by the seller/prospective seller. Through the Listing Module 625 and Prospect Module 630, a user can set conditions based on feedback of other users, such as whether or not the user wishes to transact with another user.

Figure 2:
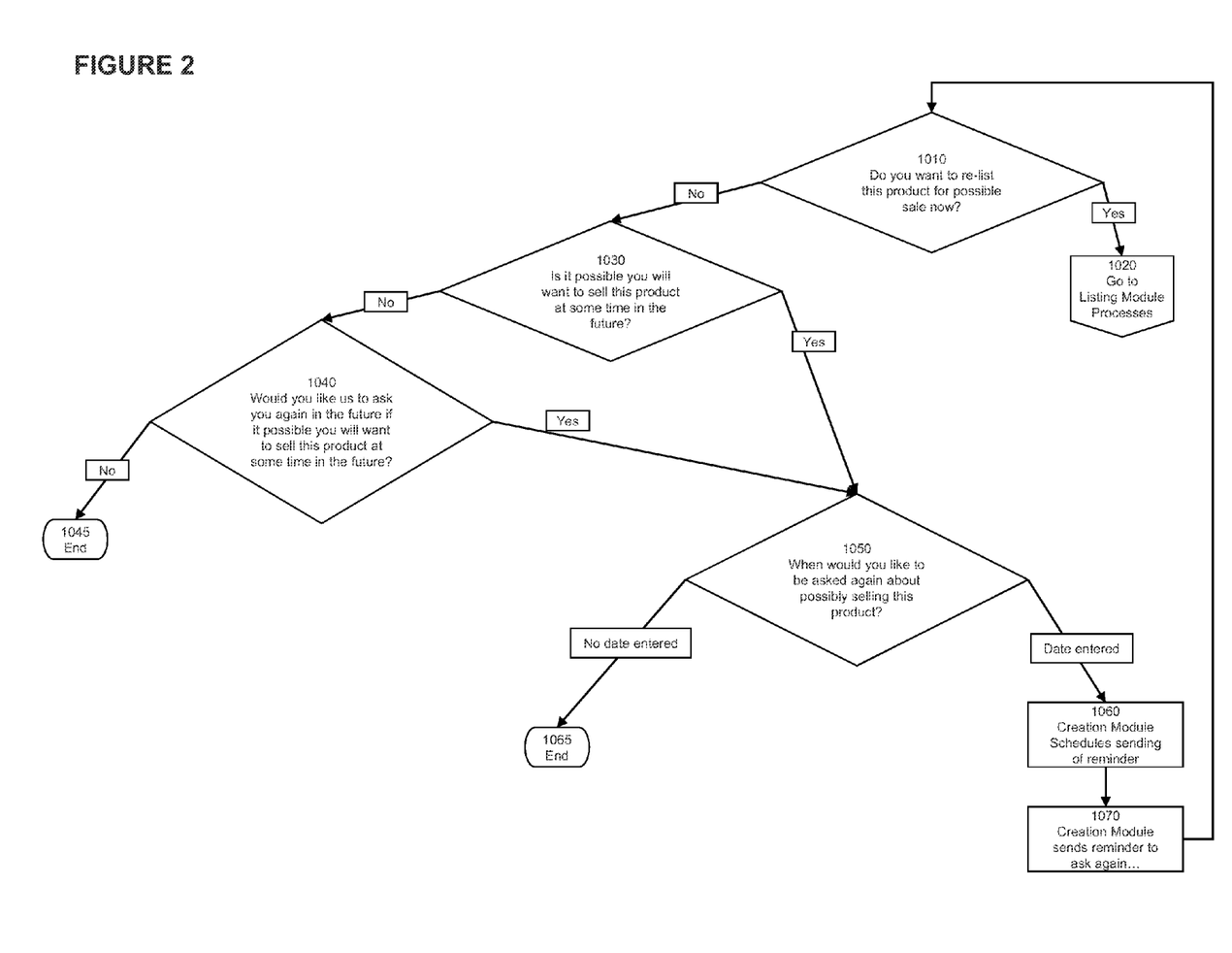
FIG. 2 is a flow chart detailing the process whereby a sold product is captured into the EXPCommerce System and the buyer of the product is immediately transformed into seller/prospective seller in accordance with an exemplary embodiment of the present invention.

FIG. 2 is a flow chart detailing the process whereby a recently sold product is captured into the EXPCommerce 613 and the buyer of the product is instantly transformed into a seller/prospective seller in accordance with an exemplary embodiment of the present invention.

The buyer can immediately be transformed into a seller/prospective seller before, during and/or after the checkout process and can immediately list the product for re-sale (binding or non-binding). The Creation Module 620 of the EXPCommerce 613 first queries the seller/prospective seller (who is now transformed from the buyer to the seller/prospective seller) at step 1010. Step 1010 can occur before, during, or immediately after the time of purchase of a product, and/or multiple times in the future thereafter. Typically the Creation Module 620 will display the query in a graphical user interface. At step 1010, the Creation Module 620 displays a first query to the seller/prospective seller: "Do you want to relist this product for possible resale now?" If the Creation Module 620 receives an affirmative answer to the query of step 1010, the Creation Module 620 invokes the Listing Module 625 at step 1020 (see FIG. 3). If the Creation Module 620 receives a negative answer to the query of step 1010, the Creation Module 620 displays a second query to the seller/prospective seller at step 1030: "Is it possible that you may wish to relist this product for possible resale at some time in the future?" If the Creation Module 620 receives a negative response to the query of step 1030, the Creation Module 620 displays a third query to the seller/prospective seller at step 1040: "Would you like us to ask you again in the future if it is possible you will want to sell this product at some time in the future?" If the Creation Module 620 receives a negative response to the query of step 1040, the Creation Module 620 ends the queries (step 1045). If the Creation Module 620 receives an affirmative response to the query of step 1040, or if the Creation Module 620 receives an affirmative response to the inquiry of step 1030, the Creation Module 620 displays a fourth inquiry at step 1050: "When would you like to be asked again about possibly selling this product?" If the Creation Module 620 does not receive a date from the seller/prospective seller, the Creation Module 620 then ends the queries. If the Creation Module 620 receives a date entered by the seller/prospective seller, the Creation Module 620 records the selected date on which to contact the seller/prospective seller to ask the seller/prospective seller again about possibly selling the product at step 1060. The Creation Module 620 then displays a fifth query on the selected date at step 1070: "Do you want to relist this product for possible sale now?" and the process returns to step 1010.

Figure 3:
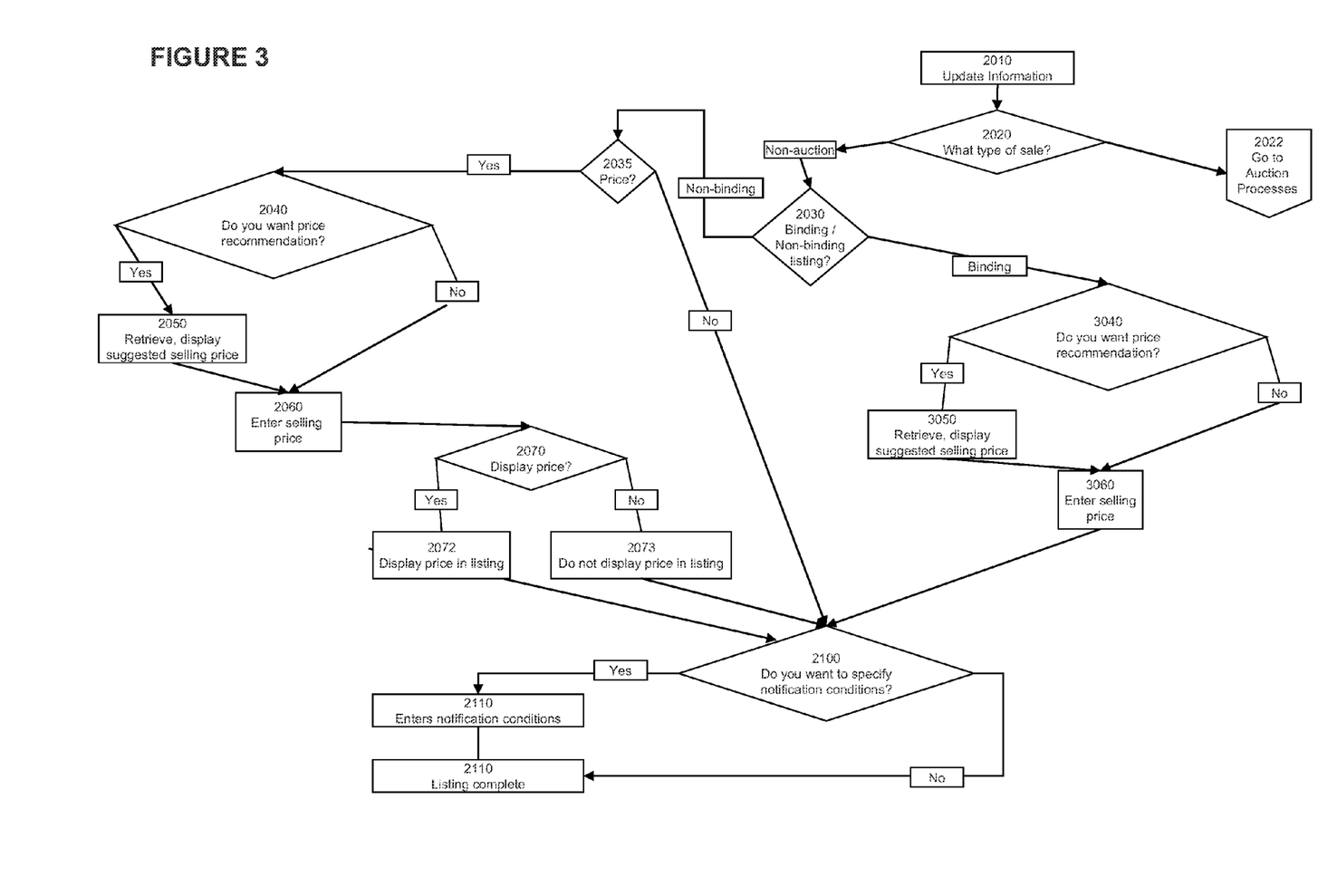
FIG. 3 is a flow chart detailing the process of creating a product listing in accordance with an exemplary embodiment of the present invention.

FIG. 3 is a flow chart detailing the process of generating a product listing in accordance with an exemplary embodiment of the present invention When the seller/prospective seller is ready to generate the product listing, EXPCommerce 613 enables the seller/prospective seller to do so without going through the current industry standard listing process of entering all of the product information.

Listing is created from the product information which was captured previously from previous sale(s) and stored in the Product Database 670, and which typically does not change as a product is resold multiple times throughout its life. Static product information can include but is not limited to: product name, description, manufacturer, brand, model number, UPC, product dimensions, product weight, shipping dimensions, shipping weight, product materials, packaging, warranty information, author, artist, ISBN, product images, merchandising collateral and/or other relevant information. Although the static information typically does not change, the seller/prospective seller is able to modify the information.

Variable information typically does change each time a product is listed for resale, and variable information should be updated by the seller/prospective seller. Variable information includes, but is not limited to, one or more of the following: pricing, condition update, terms of availability, location, shipping terms/options/limitations, and/or any other relevant information.

Product listings also contain historical transactional and ownership information related to previous purchases of the product that accumulates as the product is sold multiple times throughout its life. The historical transactional and ownership information is stored in and retrieved from the Transaction Database 675. Historical transactional information includes but is not limited to transaction channel, unique transaction number, transaction date, seller, buyer, communication/negotiations between seller and buyer, the location of a product, the ship method, listing price, transaction price or other consideration (if different from listing price), listing fees, commissions, product condition, condition update notes, returns, exchanges, product reviews and other relevant information.

The EXPCommerce 613 updates and appends the historical transactional and ownership information each time a product sells, and attaches it to the product listing each time a product is listed for resale. Historical transactional and ownership information cannot be modified. The seller/prospective seller may select to hide the historical transactional and ownership information, although hiding this information may discourage a potential buyer.

At step 2010, the Listing Module 625 first prompts the seller/prospective seller to update the product listing's information, and the EXPCommerce 613 stores any changes and displays them in the product listing when the listing is complete.

At step 2020, the Listing Module 625 then first displays a query inquiring what type of sale the seller/prospective seller would like to create: auction or non-auction. In accordance with an embodiment of the present invention, the EXPCommerce 613 supports both fixed-price sale and auction; and a seller can generate a listing to sell a product in an "auction" using the Listing Module 625. If the Listing Module 625 receives a reply of an auction to the query of step 2020, the Listing Module 625 invokes the auction processes at step 2022 (see FIG. 4). If the Listing Module 625 receives a reply of a non-auction to the query of step 2020, the Listing Module 625 of the EXPCommerce 613 then displays a second query inquiring whether the seller/prospective seller would like to create a binding or non-binding product listing at step 2030. The Seller/prospective seller can create a binding listing in which the seller/prospective seller is obligated to sell the product according to the terms of the product listing specified by the seller/prospective seller. Alternatively, the seller/prospective seller can create a non-binding listing, in which seller/prospective seller may wish to explore selling the product, but is not obligated to sell the product, and/or can solicit interested prospective buyers to communicate their interest in, inquire about, and/or submit purchase offers for the product. A non-binding listing can be used by the seller/prospective seller to gauge the level of current demand for a product, and influence the seller/prospective seller to eventually decide to sell the product. The Seller/prospective seller can select to create a non-binding listing with or without a price, and can select whether or not to display the price.

If the Listing Module 625 receives "binding" as a response to the query of step 2030, the Listing Module 625 displays a third query at step 3040 inquiring whether the seller/prospective seller would like to receive a price recommendation. The EXPCommerce 613 can suggest a selling price based on at least one of the following criteria: current selling price of a same or similar product; in the marketplace or other marketplaces, purchase price history of a same or similar product, and/or the product ownership history for a same or similar product. In addition, during the listing process and/or anytime thereafter, the seller/prospective seller can request and receive information about the prospective buyers, supply and demand for the product, etc, which may influence the seller/prospective seller to modify the selling price or other terms of the listing. If the Listing Module 625 receives an affirmative response to the query of step 3040, the Listing Module 625 retrieves and displays price recommendations at step 3050. If the Listing Module 625 receives a negative response to the query of step 3040 or following step 3050, the Listing Module 625 prompts the seller/prospective seller to enter a selling price at step 3060. After the Listing Module 625 receives a selling price, the Listing Module 625 proceeds to step 2100.

If the Listing Module 625 receives "non-binding" as a response to the second query (step 2030), the Listing Module 625 displays another query at step 2035 inquiring whether the seller/prospective seller would like to enter a selling price. If the Listing Module 625 receives a negative response, Listing Module 625 proceeds to step 2100. If the Listing Module 625 receives an affirmative reply to the query of step 2035, the Listing Module 625 displays another query inquiring whether the seller/prospective seller would like to receive a price recommendation at step 2040. If the Listing Module 625 receives an affirmative response to the inquiry of step 2040, the Listing Module 625 retrieves and displays price recommendations at step 2050. If the Listing Module 625 receives a negative response to the inquiry of step 2040, or after step 2050, the Listing Module 625 then prompts the seller/prospective seller to enter a selling price at step 2060.

After the Listing Module 625 receives a selling price, the Listing Module 625 displays a query at step 2070 inquiring whether the seller/prospective seller would like to display the selling price. If the Listing Module 625 receives an affirmative response to the inquiry of step 2070, the Listing Module 625 then displays the selling price in the listing at step 2072. If the Listing Module 625 receives a negative response to the inquiry of step 2070, the Listing Module 625 does not display the selling price in the listing.

After step 2070 or step 3060, or if the Listing Module 625 receives a negative response to the inquiry of step 2035, the Listing Module 625 proceeds to step 2100. In step 2100, the Listing Module 625 displays a query inquiring if there are any conditions about which, when met, the seller/prospective seller would like to be notified. If the Listing Module 625 receives an affirmative response to the inquiry of step 2100, the Listing Module 625 prompts the seller/prospective seller to specify the notification conditions at step 2110. The seller/prospective seller can create one or more conditions under which the Communications Module 635 should notify the seller/prospective seller. Conditions may include but are not limited to: a specified or predetermined change in supply or demand of the product or any other specified product; when/if the product has been on the market/available for sale for a specified period of time; when a prospective buyer specifies to be notified now or at some time in the future regarding a seller/prospective seller's product; qualifications of a prospective buyer, including feedback rating, geographic location, transactional history. If the Listing Module 625 receives a negative response to the inquiry of step 2100, or after the seller/prospective seller has specified conditions in step 2110, the listing is completed at step 2115.

The EXPCommerce 613 supports both fixed-price sale and auction. The seller/prospective seller can generate a listing to sell a product in an auction using the Listing Module 625. Auctions can occur within EXPCommerce or on a third-party auction platform such as but not limited to eBay®, Ubid®, Yahoo!® Auctions, Amazon Auctions®, and Overstock.com Auctions$^{SM}$, or an offline auction, whether live in person or via telephone or mail or any other industry standard method of conducting an auction.

Figure 4:
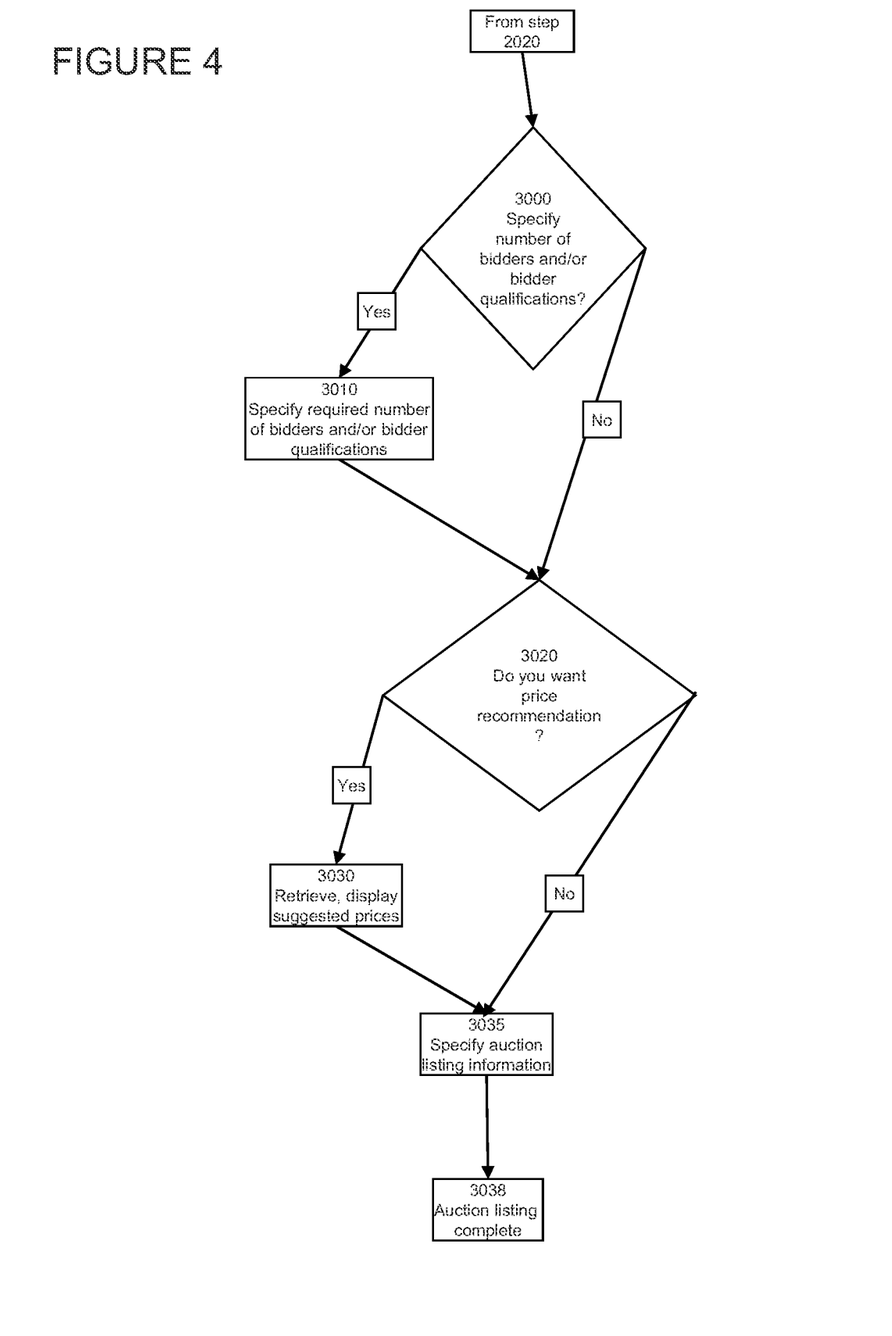
FIG. 4 is a flow chart detailing the process of creating an auction in accordance with an exemplary embodiment of the present invention.

If the Listing Module 625 receives a reply of an auction to the query of step 2020, the Listing Module 625 invokes the auction processes at step 2022. FIG. 4 is a flow chart detailing the process of creating an auction in accordance with an exemplary embodiment of the present invention. The seller/prospective seller can choose to initiate an auction for a product when a specified number of prospective buyers, with or without qualifications specified by the seller/prospective seller, register to participate in the auction for a product. The auction specification can be modified if the seller/prospective seller so desires. For example, the seller/prospective seller can choose whether or not to make known the select number of registered prospective buyers required to initiate the auction, as well as whether or not to make known the specified prospective buyer qualifications. In an alternate embodiment of the present invention, the seller/prospective seller can initiate an auction without prospective buyer registration.

At step 3000, the Listing Module 625 displays a query inquiring if the seller/prospective seller would like to select the number of prospective buyers, with or without qualifications, which must register to participate in the auction prior to commencing the auction. If the Listing Module 625 receives an affirmative response to the inquiry of step 3000, the Listing Module 625 then prompts the seller/prospective seller at step 3010: to specify the number of prospective buyers required to register for the auction prior to the commencement of the auction; to specify any qualifications of the prospective buyers to choose whether or not to make known the select number of registered prospective buyers required to initiate the auction; and whether or not to make known the specified prospective buyer qualifications. The EXPCommerce System 613 notifies the seller/prospective seller when the specified number of qualified prospective buyers has registered. During step 3010 or at any time thereafter, the seller/prospective seller can also choose to receive additional notifications according to conditions specified by the seller/prospective seller. For example, the seller/prospective seller can choose to be notified: each time a prospective buyer registers regardless of the qualifications of the prospective buyer; each time a prospective buyer with select qualifications registers; each time a certain number of prospective buyers registers, etc. The seller/prospective seller can modify communication conditions at any time thereafter.

If the Listing Module 625 receives a negative response to the inquiry of step 3000, or after the Listing Module 625 receives a specified number of prospective buyers required to register for the auction and/or specified qualifications of the prospective buyers at step 3010, the Listing Module 625 displays a query at step 3020 inquiring if the seller/prospective seller would like to receive price recommendations. In an exemplary embodiment of the present invention, the EXPCommerce 613 can provide price recommendations based on but not limited to at least one of the following: current selling price of the same or similar product in the marketplace or other marketplaces; purchase price history of the same or similar product; and/or the product ownership history for the same or similar product.

If the Listing Module 625 receives an affirmative response to the inquiry of step 3020, the Listing Module 625 retrieves and displays one or more price recommendations at step 3030. If the Listing Module 625 receives a negative response to the inquiry of step 3020 or after the Listing Module 625 retrieves and displays one or more price recommendations at step 3030, the Listing Module 626 then prompts the seller/prospective seller at step 3040 to complete the auction listing by entering additional auction information. The auction information can include but is not limited to: the auction site, the start date/time, duration, minimum bid, buy-it-now price, reserve price if any, whether or not to hide the reserve price, whether the auction listing is binding or non-binding, and other relevant information. The Listing Module 625 records these values and the auction listing is complete at step 3038.

While the present invention has been particularly described with respect to the illustrated embodiments, it will be appreciated that various alterations, modifications and adaptations may be made based on the present disclosure, and are intended to be within the scope of the present invention. It is intended that the appended claims be interpreted as including the embodiments discussed above, those various alternatives which have been described and all equivalents thereto.

What is claimed is:

1. A computer implemented method for a buyer to sell a product/service prior to purchasing the product/service in an electronic marketplace, comprising the steps of:
   querying the buyer of the product/service in a buy/sell transaction to sell the product/service in the electronic marketplace before the buyer purchases the product/service via a client device associated with the buyer by a creation module of a server managing the electronic marketplace over a communications network;
   relisting the product/service for resale on behalf of the buyer by a listing module of the server in the electronic marketplace before the buyer completes the buy/sell transaction to purchase the product/service from the seller; and
   processing a buy/sell transaction of the product/service between the buyer and another buyer by a transaction module of the server before the buyer completes the buy/sell transaction to purchase the product/service from the seller, thereby facilitating current or future sale of the product/service before the buyer purchases the product/service.

2. The method of claim 1, further comprising the step of receiving a request to purchase the product/service from a client device associated with another buyer by the transaction module of the server over the communications network.

3. The method of claim 1, further comprising the step of storing the request to sell the product/serviced received from the client device associated with the buyer in a database.

4. The method of claim 1, further comprising the step of receiving a request to relist the product/service from the client device associated with the buyer by the listing module of the server over the communications network.

5. A computer implemented method for a buyer to sell a product/service during a purchase of the product/service in an electronic marketplace, comprising the steps of:
   querying the buyer during a buy/sell transaction of the product/service in the electronic marketplace to sell the product/service via a client device associated with the buyer by a creation module of a server managing the electronic marketplace over a communications network;
   relisting the product/service for resale on behalf of the buyer by a listing module of the server in the electronic marketplace before or during the buyer's purchase of the product/service from the seller; and
   processing a buy/sell transaction of the product/service between the buyer and another buyer by a transaction module of the server before or during the buyer's purchase of the product/service from the seller, thereby facilitating current or future sale of the product/service during the buyer's buy/sell transaction of the product/service.

6. The method of claim 5, further comprising the step of receiving a request to purchase the product/service from a client device associated with another buyer by the transaction module of the server over the communications network.

7. The method of claim 5, further comprising the step of storing the request to sell the product/serviced received from the client device associated with the buyer in a database.

8. The method of claim 5, further comprising the step of receiving a request to relist the product/service from the client device associated with the buyer by the listing module of the server over the communications network.

9. A non-transitory computer readable medium comprising computer executable code for a buyer to sell a product/service prior to or during a purchase of the product/service in an electronic marketplace, the code comprising instructions for:

querying the buyer of the product/service in a buy/sell transaction in the electronic marketplace to sell the product/service before or during the buyer's purchase of the product/service via a client device associated with the buyer by a creation module of a server managing the electronic marketplace over a communications network;

relisting the product/service for resale on behalf of the buyer by a listing module of the server in the electronic marketplace before or during the buyer's purchase of the product/service from the seller; and processing a buy/sell transaction of the product/service between the buyer and another buyer by a transaction module of the server before or during the buyer's purchase of the product/service from the seller, thereby facilitating current or future sale of the product/service before the buyer completes the purchase of the product/service.

10. The computer readable medium of claim 9, wherein said computer executable code further comprises instructions for receiving a request to purchase the product/service from a client device associated with another buyer by the transaction module of the server over the communications network.

11. The computer readable medium of claim 9, wherein said computer executable code further comprises instructions for storing the request to sell the product/serviced received from the client device associated with the buyer in a database.

12. The computer readable medium of claim 9, wherein said computer executable code further comprises instructions for receiving a request to relist the product/service from the client device associated with the buyer by the listing module of the server over the communications network.

13. A system for a buyer to sell a product/service prior to or during a purchase of the product/service in an electronic marketplace, comprising:

a plurality of client devices connected to a communications network, each client device associated with a unique user; and a server connected to the communications network and for managing the electronic marketplace, the server comprising:

a creation module for querying a buyer of the product/service in a buy/sell transaction to sell the product/service in the electronic marketplace via a client device associated with the buyer over the communications network; and a listing module for relisting the product/service for resale in the electronic marketplace before or during the buyer's purchase of the product/service from the seller; and a transaction module for processing a buy/sell transaction of the product/service between the buyer and another buyer before or during the buyer's purchase of the product/service from the seller, thereby facilitating current or future sale of the product/service before the buyer completes the purchase of the product/service.

14. The system of claim 13, wherein the transaction module receives a request to purchase the product/service from a client device associated with another buyer over the communications network.

15. The system of claim 13, further comprising a database for storing the request to sell the product/serviced received from the client device associated with the buyer in a database.

16. The system of claim 13, wherein the listing module receives a request to relist the product/service from the client device associated with the buyer over the communications network.

* * * * *